United States Patent
Beierl et al.

(10) Patent No.: US 9,102,367 B1
(45) Date of Patent: Aug. 11, 2015

(54) SPOILER FOR A MOTOR VEHICLE

(71) Applicant: Dr. Ing. h.c. F. Porsche Aktiengesellschaft, Stuttgart (DE)

(72) Inventors: Dominik Beierl, Korntal-Muenchingen (DE); Jochen Meder, Weissach (DE); Joachim Paul, Stuttgart (DE); Frank Neubrand, Weil der Stadt (DE); Haiko Neher, Sachsenheim (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 0 days.

(21) Appl. No.: 14/308,794

(22) Filed: Jun. 19, 2014

(30) Foreign Application Priority Data

Jun. 19, 2013 (DE) .......................... 10 2013 106 400

(51) Int. Cl.
*B62D 35/00* (2006.01)
(52) U.S. Cl.
CPC .................... *B62D 35/007* (2013.01)
(58) Field of Classification Search
CPC .............................. B62D 35/00; B62D 35/007
See application file for complete search history.

(56) References Cited

U.S. PATENT DOCUMENTS

| | | | |
|---|---|---|---|
| 4,738,479 A * | 4/1988 | Filtri et al. .................. | 296/15 |
| 5,165,751 A | 11/1992 | Matsumoto et al. | |
| 8,226,153 B2 | 7/2012 | Molnar et al. | |
| 2007/0228772 A1 | 10/2007 | Froeschle et al. | |
| 2007/0236045 A1 | 10/2007 | Froeschle et al. | |
| 2007/0236046 A1* | 10/2007 | Froeschle et al. .......... | 296/180.5 |
| 2009/0286461 A1 | 11/2009 | Molnar et al. | |

FOREIGN PATENT DOCUMENTS

| | | |
|---|---|---|
| DE | 1919325 | 11/1970 |
| DE | 4207658 | 9/1993 |
| DE | 10063581 | 7/2002 |
| DE | 102008053770 | 4/2010 |
| EP | 1118529 | 7/2001 |
| FR | 2874579 | 3/2006 |

OTHER PUBLICATIONS

British Patent Appl. No. 1410582.9—Combined Search and Examination Report issued on Dec. 5, 2014.

* cited by examiner

*Primary Examiner* — Lori L Lyjak
(74) *Attorney, Agent, or Firm* — Gerald E. Hespos; Michael J. Porco; Matthew T. Hespos

(57) ABSTRACT

A rear spoiler for a motor vehicle has a spoiler body (14) for deflecting a stream of air to provide an aerodynamic effect. The spoiler body (14) has a main spoiler (16) with a main surface (21) and an auxiliary spoiler (18) with an auxiliary surface (62). A multi-jointed actuating kinematics (34) can move the main spoiler (16) and the auxiliary spoiler (18) between a storage position where the auxiliary surface (62) of the auxiliary spoiler (18) is at least partially below the main spoiler (16) and a use position where the auxiliary spoiler (18) is substantially in a common plane with the main surface (21).

10 Claims, 1 Drawing Sheet

SPOILER FOR A MOTOR VEHICLE

CROSS REFERENCE TO RELATED APPLICATION

This application claims priority under 35 USC 119 to German Patent Appl. No. 10 2013 106 400.0 filed on Jun. 19, 2013, the entire disclosure of which is incorporated herein by reference.

BACKGROUND

1. Field of the Invention

The invention relates to a rear spoiler for a motor vehicle.

2. Description of the Related Art

EP 1 118 529 A2 discloses a rear spoiler with a spoiler body that can be shifted between a storage position and a use position with the aid of an adjustment unit that is extendable in a translatory manner. The spoiler body has a main spoiler that can be shifted by the adjustment unit and an auxiliary spoiler that is accommodated in a cavity of the main spoiler. The auxiliary spoiler can be extended out of the main spoiler along a linear guide with the aid of a lever drive provided within the main spoiler.

There is a need to improve the aerodynamic effect of a spoiler by structural measures that are simple to implement.

It is the object of the invention to provide a structurally simply constructed spoiler having a good aerodynamic effect.

SUMMARY OF THE INVENTION

The invention relates to a rear spoiler for a motor vehicle. The spoiler comprises a spoiler body for deflecting a stream of air to provide an aerodynamic effect. The spoiler also has multi-jointed actuating kinematics for shifting the spoiler body between a storage position and a use position. The spoiler body has a main spoiler with a main surface and an auxiliary spoiler with an auxiliary surface. The actuating kinematics can move the auxiliary spoiler relative to the main spoiler. In the storage position, the auxiliary surface of the auxiliary spoiler is at least partially positioned in the direction of gravitational force below the main spoiler. However, in the use position, the auxiliary surface of the auxiliary spoiler is substantially in a common plane with the main surface. The auxiliary spoiler is moveable past the main spoiler by the actuating kinematics during a movement between the storage position and the use position outside the main spoiler.

The main spoiler and the auxiliary spoiler of the spoiler body can be configured as constructional units that are separated from each other. In particular, the main spoiler does not have to be adapted to the geometry of the auxiliary spoiler or vice versa. In particular, it is not necessary to provide space for receiving the auxiliary spoiler and/or kinematics for shifting the auxiliary spoiler relative to the main spoiler within the main spoiler. Thus, the main spoiler and the auxiliary spoiler can be constructed in a structurally simple manner and dimensioned to save construction space. A coupling of the movement of the main spoiler relative to the auxiliary spoiler takes place completely outside the spoiler body by a suitable kinematic joining of the main spoiler and the auxiliary spoiler to the actuating kinematics. In this respect, the spoiler body is of at least two-part design, with the main spoiler and the auxiliary spoiler always being separated from each other by a gap. Links are joined in an articulated manner to the main spoiler and to the auxiliary spoiler and are connected in an articulated manner to the actuating kinematics so that a relative movement of links of the actuating kinematics can be converted into a relative movement of the auxiliary spoiler with respect to the main spoiler. As a result, the auxiliary spoiler can be moved past the main spoiler without colliding with the main spoiler in the use position to increase the surface of the spoiler body that can be impinged on. The coupling of the main spoiler and the auxiliary spoiler to the actuating kinematics separately from each other and substantially independently permits a structurally simple spoiler having a good aerodynamic effect.

In the use position, the auxiliary surface and the main surface are arranged with respect to each other to avoid a separation of a flow at the surface of the spoiler body, which occurs due to a slipstream. An excessively sized separating gap between the auxiliary spoiler and the main spoiler and/or an excessively sized height offset of the auxiliary surface with respect to the main surface can be avoided. The common plane in which the auxiliary surface and the main surface lie can be a rectilinear or a curved plane that preferably is continuously differentiable. For example, the surface of the spoiler body that is assembled by the auxiliary surface and the main surface can have, in the direction of travel, a curved profile located in the plane to deflect a slipstream away from the underlying surface and to increase a contact pressure on an underlying surface.

The actuating kinematics can move the spoiler body between the storage position, in which the spoiler body is used in an upper side of a motor vehicle body, and the use position, in which the spoiler body provides an aerodynamic effect. During this movement, the main spoiler and the auxiliary spoiler carry out different movements. For example, in comparison to the storage position, the main spoiler can be shifted counter to the direction of travel of the motor vehicle in the use position, whereas the auxiliary spoiler, in comparison to the storage position, can be shifted in the direction of travel of the motor vehicle in the use position.

The actuating kinematics can have, for example, a linkage with links that are connected to one another in an articulated manner. The actuating kinematics preferably are designed as a seven-bar linkage with seven pivoting bearings. The actuating kinematics can have a drive link that is displaceable and/or rotatable by a drive unit to shift the spoiler body between the storage position and the use position and optionally to rotate the spoiler body. In particular, intermediate positions between the storage position and the use position can also be approached with the aid of the actuating kinematics.

Part of the auxiliary surface can be covered by the main spoiler in the storage position, and therefore at least part of the auxiliary surface cannot be impinged on by a slipstream in the storage position. The previously covered surface can appear and can be impinged on by the slipstream in the use position. The main spoiler has a larger surface that can be impinged on than the auxiliary spoiler in the use position.

The actuating kinematics preferably have a drive link that is displaceable and/or pivotable by a drive unit. First and second connecting links are connected in an articulated manner to the drive link. A joining link is connected to the main spoiler and is connected in an articulated manner to the first amd second connecting link. Furthermore, a guide link is connected in an articulated manner to the first connecting link or to the second connecting link and can be articulated on the motor vehicle body. As a result, upon actuation of the actuating kinematics, a defined pivoting movement of the respective links can be predetermined with the aid of the drive link. The actuating kinematics can thereby have main kinematics in the form of a seven-bar linkage for shifting the main spoiler relative to the motor vehicle body. The drive link, the first connecting link, the second connecting link and the joining link can be connected in an articulated manner to one another substantially in the manner of a rectangle. A non-parallel movement of the joining link with respect to the drive link by a pivoting portion can be achieved by a different effective length between the articulation points of the respective connecting link and/or a non-parallel arrangement of the connecting links. This makes it possible for the spoiler body to be accommodated in an aerodynamically favorable manner in the motor vehicle body in the storage position and for a suitable positioning angle of the spoiler body to be approached in the use position.

An auxiliary drive link and an auxiliary guide link preferably are connected in an articulated manner to the joining link. An auxiliary joining link is connected to the auxiliary spoiler and is connected in an articulated manner to the auxiliary drive link and to the auxiliary guide link. As a result, the actuating kinematics can have auxiliary kinematics for shifting the auxiliary spoiler relative to the main spoiler. The auxiliary kinematics may be configured as a four-bar linkage. With the aid of the auxiliary guide link, the auxiliary joining link can be pivoted about the articulated joining of the auxiliary guide link to the joining link. Additionally, the auxiliary drive link can carry out an additional rotation of the auxiliary joining link about the articulated joining of the auxiliary guide link to the auxiliary joining link by an articulated joining to the auxiliary joining link at a distance from the articulated joining of the auxiliary guide link to the auxiliary joining link. As a result, a movement of the auxiliary spoiler between a position below the main spoiler in the storage position and the position of the auxiliary spoiler laterally next to the main spoiler in the use position past the main spoiler can be carried out using structurally simple auxiliary kinematics.

The auxiliary drive link is connected in an articulated manner to the first connecting link or to the second connecting link. Thus, the auxiliary kinematics can be actuated automatically during a movement of the main kinematics, and therefore it is unnecessary to provide a separate drive and/or an additional guide for the movement of the auxiliary spoiler.

The articulated connections of the actuating kinematics may take place via a pivoting bearing formed with the components to be connected in an articulated manner. The respective pivoting bearings preferably are different from one another and are spaced apart from one another to permit a corresponding pivoting movement.

A laterally open receiving pocket for receiving the auxiliary spoiler preferably is formed between the actuating kinematics and the main spoiler. The receiving socket may be between a joining link connected to the main spoiler and a main lower side of the main spoiler. The lower side faces away from the main surface. The joining link can in particular be of substantially L-shaped design on the side facing the main spoiler in order to provide the receiving pocket between the limbs of the imaginary L. This produces a compact arrangement of the spoiler saving on construction space in the storage position.

The auxiliary surface preferably merges in the flow direction in a substantially step-free manner into the main surface via a separating gap. The separating gap can be selected to be sufficiently small that flow separation can be avoided. Furthermore, it is possible to select the separating gap to be sufficiently large that, during a relative movement of the auxiliary spoiler with respect to the main spoiler, striking of the auxiliary spoiler against the main spoiler can be avoided.

In the use position, the spoiler body preferably has a larger extent, provided by the main spoiler and the auxiliary spoiler, in the direction of travel than in the storage position. The main spoiler and the auxiliary spoiler can be pivoted relative to each other during a movement from the storage position into the use position along or counter to the direction of travel, and therefore the distance over which the slipstream flows along the spoiler body can be increased. In the use position, the auxiliary spoiler preferably is positioned in front of the main spoiler in the direction of travel as a type of preliminary spoiler for the main spoiler, and therefore the slipstream first of all strikes against the auxiliary spoiler and subsequently against the main spoiler.

The invention also relates to a motor vehicle with a motor vehicle body. The motor vehicle body has an upper side that faces away from an interior and can be impinged on, and the above-described spoiler that is articulated on the motor vehicle body. The surface of the spoiler body that can be impinged on is integrated, in the storage position, into the shape profile of the upper side of the motor vehicle body. The coupling of the main spoiler and the auxiliary spoiler permits a structurally simple spoiler having a good aerodynamic effect for the motor vehicle.

The invention is explained by way of example below using exemplary embodiments with reference to the attached drawings. Features illustrated below can constitute be used individually and also in combination.

DETAILED DESCRIPTION OF THE PREFERRED EMBODIMENTS

Figure 1:
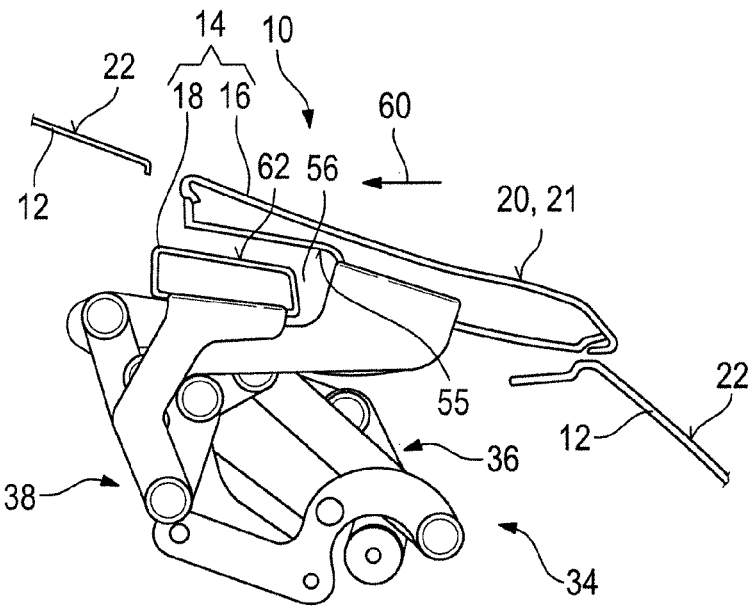
FIG. 1 shows a schematic side view of a spoiler in a storage position.

A rear spoiler in accordance with the invention is identified by the numeral 10 in FIG. 1 and is recessed in a motor vehicle body 12 of a motor vehicle. The spoiler 10 has a spoiler body 14 with an upper main spoiler 16 and an auxiliary spoiler 18 that is pivotable relative to the main spoiler 16. The spoiler body 14 has an outwardly facing surface 20 that can be impinged on. The outwardly facing surface 20 is formed exclusively by a main surface 21 of the main spoiler 16 in the storage position illustrated in FIG. 1. The auxiliary spoiler 18 is positioned below the main spoiler 16 in the storage position. The surface 20 of the spoiler body 14 can be integrated into the shape profile of an outer side 22 of the motor vehicle body 12 that faces outward from a passenger compartment of the motor vehicle.

Figure 2:
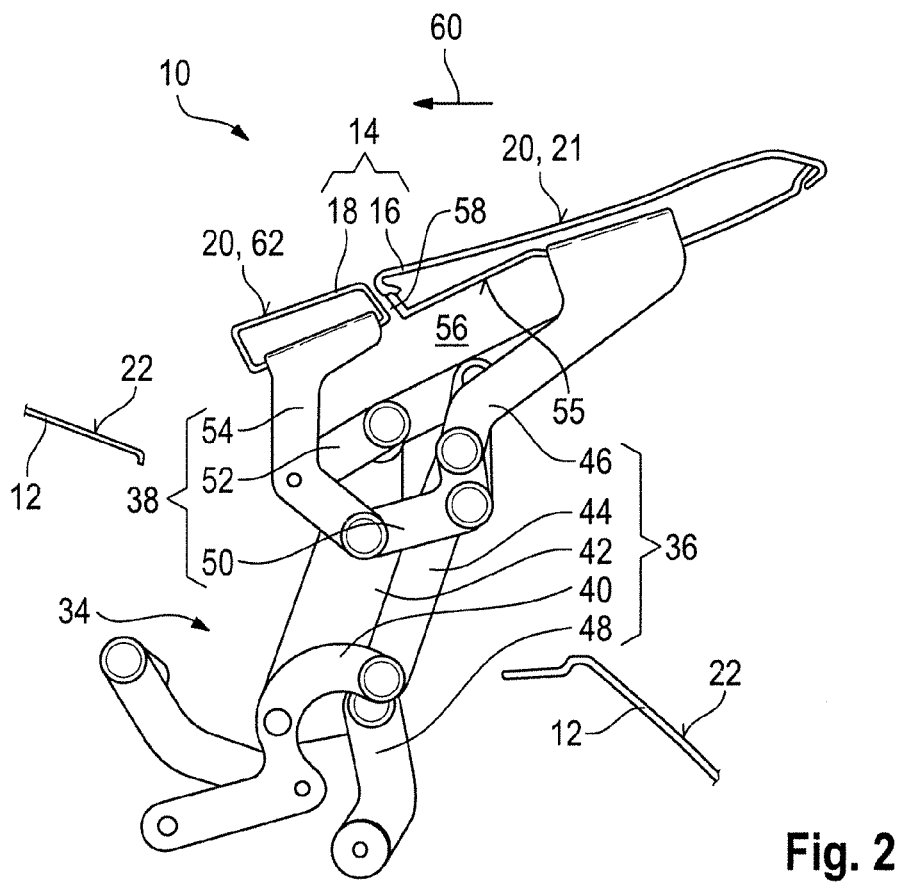
FIG. 2 shows a schematic side view of the spoiler from FIG. 1 in a use position.

The spoiler body 14 is connected to actuating kinematics 34 that can move the spoiler body 14 from the storage position shown in FIG. 1 into the use position shown in FIG. 2. The actuating kinematics 34 has main kinematics 36 and auxiliary kinematics 38. The main kinematics 38 define a seven-bar linkage for shifting the main spoiler 16 relative to the motor vehicle body 12. The auxiliary kinematics 38 are joined to the main kinematics 36 and define a four-bar linkage for shifting the auxiliary spoiler 18 relative to the main spoiler 16. As can be seen in FIG. 2, the main kinematics 36 have a drive link 40 that is displaceable and/or pivotable by a drive unit and is connected in an articulated manner to first and second connecting links 42 and 44. The first and second connecting links 42 and 44 are connected in an articulated manner to a joining link 46 that is connected to the main spoiler 16. The first connecting link 42 also is connected in an articulated manner to a guide link 48 that is joined in an articulated manner to the motor vehicle body 12. The auxiliary kinematics 38 are joined in an articulated manner to the joining link 46. For this purpose, an auxiliary drive link 50 and an auxiliary guide link 52 are connected in an articulated manner to the joining link 46. The auxiliary drive link 50 and the auxiliary guide link 52 are connected in an articulated manner to an auxiliary joining link 54 that is connected to the auxiliary spoiler 18.

The main spoiler 16 has a main lower side 55 that faces away from the main surface 21. A receiving pocket 56 is formed between the joining link 46 and the main lower side 55 of the main spoiler 16. The auxiliary spoiler 18 can be positioned in a space-saving manner in the receiving pocket 56 in the storage position illustrated in FIG. 1 and can be moved out laterally from the receiving pocket 56 by the auxiliary kinematics 38 during a movement into the use position illustrated in FIG. 2. The auxiliary spoiler 18 is in front of the main spoiler 16 in the use position illustrated in FIG. 2 and is spaced from the main spoiler 16 in the direction of travel 60 with a small separating gap 58 defined between the main spoiler 16 and the auxiliary spoiler 18. As a result, the main surface 21 of the main spoiler 16 and an auxiliary surface 62 of the auxiliary spoiler 18 can be positioned in a common plane. Therefore the surface 20 of the spoiler body 14 that can be impinged on by a slipstream is assembled by both the main surface 21 and by the auxiliary surface 62 and is enlarged in comparison to the storage position.

What is claimed is:

1. A rear spoiler for a motor vehicle, comprising
a spoiler body for deflecting a stream of air to provide an aerodynamic effect, the spoiler body having a main spoiler with opposite upper and lower main surfaces and, the spoiler body further having an auxiliary spoiler with an upper auxiliary surface; and
multi-jointed actuating kinematics for shifting the spoiler body between a storage position where the upper auxiliary surface of the auxiliary spoiler is at least partially positioned in a direction of gravitational force below the lower main surface of the main spoiler and a use position where the actuating kinematics moves the auxiliary spoiler forward and up past the main spoiler so that the upper auxiliary surface of the auxiliary spoiler is substantially in a common plane with the upper main surface of the main spoiler.

2. The spoiler of claim 1, wherein the actuating kinematics have a drive link that is movable by a drive unit, a first connecting link and a second connecting link being connected in an articulated manner to the drive link, and a joining link connected to the main spoiler and connected in an articulated manner to the first and second connecting links.

3. The spoiler of claim 2, further comprising an auxiliary drive link and an auxiliary guide link connected in an articulated manner to the joining link, and an auxiliary joining link connected to the auxiliary spoiler and connected in an articulated manner to the auxiliary drive link and to the auxiliary guide link.

4. The spoiler of claim 3, wherein the auxiliary drive link is connected in an articulated manner to the first connecting link or to the second connecting link.

5. The spoiler of claim 1, wherein the lower main surface is formed with a forwardly and downwardly open receiving pocket configured for at least partially receiving the auxiliary spoiler.

6. The spoiler of claim 1, wherein, in the use position, the auxiliary surface merges in a flow direction in a substantially step-free manner into the upper main surface with a separating gap between the upper auxiliary surface at a rear end of the auxiliary spoiler and the upper main surface at a front end of main spoiler.

7. The spoiler of claim 1, wherein, in the use position, the spoiler body has a surface area in a direction of travel provided by the main spoiler and the auxiliary spoiler that exceeds a surface area of the spoiler body in the storage position.

8. A motor vehicle with a motor vehicle body having an upper side that faces away from an interior and can be impinged on, and the spoiler of claim 1 articulated on the motor vehicle body, the spoiler body having a surface that can be impinged on, wherein, in the storage position, the surface of the spoiler body being integrated into a shape profile of the upper side of the motor vehicle body.

9. The spoiler of claim 1, wherein the main spoiler has closed front and rear ends extending between opposite upper and lower main surfaces.

10. A motor vehicle, comprising:
a motor vehicle body having an upper surface that faces away from an interior;
a spoiler body for deflecting a stream of air to provide an aerodynamic effect, the spoiler body having a main spoiler with opposite front and rear ends spaced apart along a forward direction of travel of the motor vehicle, upper and lower main surfaces extending between the front and rear ends of the main spoiler and facing outward on the main spoiler in substantially opposite directions, the spoiler body further having an auxiliary spoiler with an upper auxiliary surface; and
multi-jointed actuating kinematics configured for moving the spoiler body to a storage position where the upper main surface is integrated into a shape profile of the upper surface of the motor vehicle body and where the upper auxiliary surface of the auxiliary spoiler is at least partially positioned in a direction of gravitational force below the lower main surface of the main spoiler and in proximity to the front end of the main spoiler, and the actuating kinematics further being configured for moving the spoiler body to a use position where the upper main surface of the main spoiler is spaced up from the upper surface of the motor vehicle body and for moving the auxiliary spoiler forward and upward relative to the main spoiler so that the auxiliary surface is substantially in a common plane with the main surface of the main spoiler and forward of the main surface.

\* \* \* \* \*